United States Patent
Tokunaga et al.

(10) Patent No.: US 9,061,241 B2
(45) Date of Patent: Jun. 23, 2015

(54) β-ZEOLITE FOR SCR CATALYST AND METHOD FOR PURIFYING NITROGEN OXIDES USING SAME

(75) Inventors: Keisuke Tokunaga, Shunan (JP); Hiroshi Ogawa, Shunan (JP); Ko Ariga, Shunan (JP); Hidekazu Aoyama, Shunan (JP)

(73) Assignee: TOSOH CORPORATION, Yamaguchi-Ken (JP)

(*) Notice: Subject to any disclaimer, the term of this patent is extended or adjusted under 35 U.S.C. 154(b) by 480 days.

(21) Appl. No.: 12/442,458

(22) PCT Filed: Mar. 14, 2007

(86) PCT No.: PCT/JP2007/055114
§ 371 (c)(1),
(2), (4) Date: Mar. 23, 2009

(87) PCT Pub. No.: WO2008/038422
PCT Pub. Date: Apr. 3, 2008

(65) Prior Publication Data
US 2010/0003178 A1 Jan. 7, 2010

(30) Foreign Application Priority Data
Sep. 27, 2006 (JP) ................. P2006-262303

(51) Int. Cl.
*B01D 53/86* (2006.01)
*B01J 29/70* (2006.01)
*B01J 29/72* (2006.01)
*B01J 29/76* (2006.01)
*B01J 35/00* (2006.01)
*B01J 35/02* (2006.01)
*B01J 37/10* (2006.01)
*C01B 39/46* (2006.01)
*C01B 39/48* (2006.01)
*B01J 37/02* (2006.01)

(52) U.S. Cl.
CPC ....... *B01D 53/8628* (2013.01); *Y10T 428/2982* (2015.01); *B01D 2255/502* (2013.01); *B01J 29/7007* (2013.01); *B01J 29/7215* (2013.01); *B01J 29/7615* (2013.01); *B01J 35/002* (2013.01); *B01J 35/023* (2013.01); *B01J 37/0246* (2013.01); *B01J 37/10* (2013.01); *C01B 39/46* (2013.01); *C01B 39/48* (2013.01)

(58) Field of Classification Search
None
See application file for complete search history.

(56) References Cited

U.S. PATENT DOCUMENTS

| 4,560,542 A | * | 12/1985 | Robson | 423/703 |
| 4,961,917 A | * | 10/1990 | Byrne | 423/239.2 |
| 5,139,759 A | * | 8/1992 | Cannan et al. | 423/709 |
| 5,164,169 A | | 11/1992 | Rubin | |
| 5,164,170 A | | 11/1992 | Rubin | |
| 5,232,579 A | | 8/1993 | Absil et al. | |
| 5,427,765 A | | 6/1995 | Inoue et al. | |
| 5,695,728 A | * | 12/1997 | Miura et al. | 423/239.2 |
| 6,641,788 B1 | | 11/2003 | Ogawa et al. | |
| 6,689,709 B1 | * | 2/2004 | Tran et al. | 502/65 |
| 2001/0008624 A1 | | 7/2001 | Takahashi et al. | |

FOREIGN PATENT DOCUMENTS

| EP | 0 187 522 | 7/1986 |
| EP | 0 393 917 | 10/1990 |
| EP | 0 915 056 | 5/1999 |
| JP | 61-136910 | 6/1986 |
| JP | 61-281015 | 12/1986 |
| JP | 5-201722 | 8/1993 |
| JP | 6-287015 | 10/1994 |
| JP | 7-247114 | 9/1995 |
| JP | 9-38485 | 2/1997 |
| JP | 9-175818 | 7/1997 |
| JP | 2904862 | 3/1999 |
| JP | 11-216358 | 8/1999 |
| JP | 11-228128 | 8/1999 |
| JP | 2004-536756 | 12/2004 |
| JP | 2005-177570 | 7/2005 |
| WO | 02/41991 | 5/2002 |

OTHER PUBLICATIONS

Bhat et al, synthesis of zeolite beta using silica gel as a source of siO2, 1990, j. chem. tech. biotechnol. pp. 453-466.*
Na, 1991, Zeolites, vol. 11 pp. 202-210.*
Jon et al, synthesis of thermal stability of beta zeolite using ammonium fluoride, 2005, microporous and mesoporous materials, pp. 88-95.*
Third-party Observation submitted in patent family member European Patent Application No. 07738584.7, submitted to EPO on Jul. 16, 2012.
Camblor et al., "Crystallization of zeolite beta: Effect of Na and K ions", Zeolites, vol. 11, Mar. 1991.

(Continued)

Primary Examiner — Melvin C Mayes
Assistant Examiner — Stefanie Cohen
(74) Attorney, Agent, or Firm — Greenblum & Bernstein, P.L.C.

(57) ABSTRACT

An SCR catalyst using a β-zeolite in which the molar ratio of $SiO_2/Al_2O_3$ is from 20 to less than 40, the particle diameter determined by SEM is 0.35 μm or more, the full width at half maximum (FWHM) of the X-ray diffraction peak for (302) is less than 0.30°, and the amount of adsorbed $NH_3$ is 1 mmol/g or more, or has an amount of adsorbed $NH_3$ following hydrothermal aging of 0.4 mmol/g or more, demonstrates high catalytic activity for NOx reduction at low temperatures following hydrothermal aging while also demonstrating a low level of discharge of irritating ammonia in exhaust gas.

17 Claims, No Drawings

(56) References Cited

OTHER PUBLICATIONS

Jon et al., "Synthesis and thermal stability of beta zeolite using ammonium fluoride", Microporous and Mesoporous Materials, vol. 89, 2006, pp. 88-95 (available online Nov. 28, 2005).
Machine-generated English Translation of JP 9-38485, Feb. 10, 1997.
Machine-generated English Translation of JP 2005-177570, Jul. 7, 2005.
Machine-generated English Translation of JP 7-247114, Sep. 26, 1995.

\* cited by examiner

β-ZEOLITE FOR SCR CATALYST AND METHOD FOR PURIFYING NITROGEN OXIDES USING SAME

Priority is claimed of Japanese Patent Application No. 2006-262303, filed Sep. 27, 2006, the content of which is incorporated herein by reference.

BACKGROUND OF THE INVENTION

1. Field of the Invention

The present invention relates to a high-performance SCR catalyst and β-zeolite used therein.

2. Description of Related Art

β-zeolite is known as a zeolite used in NOx reduction catalysts, and particularly NOx reduction catalysts using ammonia as a reducing agent (typically referred to as selective catalytic reduction (SCR) catalysts) (see Patent Document 1).

SCR catalysts using β-zeolite were unable to be used following durability treatment in a high-temperature steam atmosphere (to be referred to as "hydrothermal aging") due to a decrease in NOx reduction performance, and due in particular to a considerable decrease in performance at temperatures of 300° C. or lower. Although this decrease in performance of SCR catalysts using β-zeolite following hydrothermal aging is thought to be mainly caused by insufficient heat resistance of β-zeolite, the cause of the considerable decrease in performance at low temperatures in particular has yet to be adequately determined. The performance of SCR catalysts using β-zeolite reported in previous documents or able to be acquired commercially is such that the NOx reduction rate is no more than 30% at 200° C. following hydrothermal aging.

β-zeolite is widely known to be used in catalysts or adsorbents, and methods such as increasing the silica/alumina ratio or increasing crystal diameter are known for improving the heat resistance thereof (see Patent Documents 2 and 3). However, in the case of increasing the silica/alumina ratio or increasing crystal diameter, the performance of SCR catalysts, and particularly the performance thereof at low temperature, has been unable to be improved.

Several proposals have been made in the past regarding improvement of the performance of SCR catalysts using β-zeolite. For example, a method for carrying out dealumination treatment by treating with steam and heat prior to use has been proposed (Patent Document 4). However, performance following hydrothermal aging was still not adequate. In addition, a method has also been reported for improving heat resistance by adding a rare earth element in addition to iron ordinarily used as a supported metal for SCR catalysts (Patent Document 5). However, the NOx reduction rate at 200° C. is still less than 30% even by using this method, while also requiring an expensive rare earth element.

In addition, since ammonia is used as a reducing agent in conventional SCR catalysts, the problem of unreacted ammonia being discharged resulting in the discharge of irritating, toxic gas has yet to be resolved (Patent Document 5).

Various methods have been proposed thus far for the production of β-zeolite (Patent Documents 5 to 9). However, β-zeolite having a high NOx reduction rate following hydrothermal aging, and particular β-zeolite having a high NOx reduction rate at low temperatures, has yet to be proposed for use as β-zeolite used as an SCR catalyst.

[Patent Document 1] Japanese Patent No. 2904862
[Patent Document 2] Japanese Unexamined Patent Application, First Publication No. H9-38485
[Patent Document 3] Japanese Unexamined Patent Application, First Publication No. H11-228128
[Patent Document 4] Published Japanese translation No. 2004-536756 of PCT International Publication
[Patent Document 5] Japanese Laid-Open Patent Application, First Publication No. 2005-177570
[Patent Document 6] Japanese Unexamined Patent Application, First Publication No. S61-136910
[Patent Document 7] Japanese Unexamined Patent Application, First Publication No. S61-281015
[Patent Document 8] Japanese Unexamined Patent Application, First Publication No. H5-201722
[Patent Document 9] Japanese Unexamined Patent Application, First Publication No. H6-287015
[Patent Document 10] Japanese Unexamined Patent Application, First Publication No. H7-247114
[Patent Document 11] Japanese Unexamined Patent Application, First Publication No. H9-175818

SUMMARY OF THE INVENTION

The present invention provides an SCR catalyst having a high catalytic activity for NOx reduction, and particularly high NOx reduction performance at low temperatures following hydrothermal aging while also demonstrating low levels of irritating and toxic residual ammonia in the exhaust gas, and a β-zeolite used therein.

As a result of conducting extensive studies on SCR catalysts using β-zeolite, and particularly SCR catalysts used at low temperatures following hydrothermal aging, the inventors of the present invention found that an SCR catalyst using a specific β-zeolite demonstrates high NOx reduction performance at low temperatures, and particularly at temperatures of 250° C. or lower, following hydrothermal aging while also enabling a reduction in the level of ammonia contained in exhaust gas, thereby leading to completion of the present invention.

As previously stated, although conventionally known methods for improving the heat resistance of β-zeolite included increasing the molar ratio of $SiO_2/Al_2O_3$ and increasing the crystal diameter; increasing the molar ratio of $SiO_2/Al_2O_3$, increasing the crystal diameter or increasing both the molar ratio of $SiO_2/Al_2O_3$ and the crystal diameter did not allow SCR catalysts having high activity at low temperatures to be obtained.

The β-zeolite for an SCR catalyst of the present invention does not use a high molar ratio of $SiO_2/Al_2O_3$ or an increased crystal diameter. It was found that β-zeolites, satisfying a specific $SiO_2/Al_2O_3$ molar ratio, crystal diameter and crystallinity as determined by XRD, and demonstrating a specific $NH_3$ adsorption, which the amount of adsorbed $NH_3$ following hydrothermal aging is within a fixed range, demonstrates high catalytic activity for NOx reduction at low temperatures following hydrothermal aging when the β-zeolite is used as the SCR catalyst which supports metals such as iron or copper.

The method for reducing nitrogen oxides of the present invention includes the inventions listed in (1) to (6) below:
(1) a method for reducing nitrogen oxides with an SCR catalyst, said SCR catalyst including β-zeolite; wherein the molar ratio of $SiO_2/Al_2O_3$ in the β-zeolite is more than or equal to 20 and less than 40; the particle diameter determined by SEM of the β-zeolite is 0.35 μm or more; the full width at half maximum (FWHM) of the X-ray diffraction peak for (302) of the β-zeolite is less than 0.30°; and the amount of adsorbed $NH_3$ of the β-zeolite is 1 mmol/g or more;

(2) a method for reducing nitrogen oxides according to (1), wherein the molar ratio of $SiO_2/Al_2O_3$ is more than or equal to 22 and less than 30; and the amount of adsorbed $NH_3$ is 1.2 mmol/g or more;
(3) a method for reducing nitrogen oxides according to (1), wherein a supported metal of the β-zeolite is at least one of a metal selected from groups of elements consisting of group VIII and group IB of a periodic table;
(4) a method for reducing nitrogen oxides according to (1), wherein said supported metal of the β-zeolite includes one or more of iron or copper;
(5) a method for reducing nitrogen oxides according to (1), wherein an NOx reduction rate of the β-zeolite following hydrothermal aging of 30% or more at 200° C.; and,
(6) a method for reducing nitrogen oxides according to (1), wherein the NOx reduction rate following hydrothermal aging of 75% or more at 250° C.

In addition, the β-zeolite of the present invention includes the inventions listed in (7) to (11) below:
(7) a β-zeolite having a molar ratio of $SiO_2/Al_2O_3$ of more than or equal to 20 and less than 40, the particle diameter determined by SEM of 0.35 μm or more, the full width at half maximum (FWHM) of an X-ray diffraction peak for (302) of less than 0.30°, and the amount of adsorbed $NH_3$ is 1 mmol/g or more;
(8) a β-zeolite according to (7), wherein the molar ratio of $SiO_2/Al_2O_3$ is more than or equal to 22 and less than 30 and the amount of adsorbed $NH_3$ is 1.2 mmol/g or more;
(9) a β-zeolite according to (7), wherein the particle diameter determined by SEM is 0.5 μm or more;
(10) a β-zeolite according to (7), wherein the molar ratio of $SiO_2/Al_2O_3$ is more than or equal to 23 and less than 29; and,
(11) a β-zeolite according to (7), wherein the full width at half maximum (FWHM) of the X-ray diffraction peak for (302) following hydrothermal aging is less than 0.35°, and the amount of adsorbed $NH_3$ is 0.4 mmol/g or more.

In addition, the SCR catalyst of the present invention includes the inventions listed in (12) to (17) below:
(12) an SCR catalyst including β-zeolite wherein a molar ratio of $SiO_2/Al_2O_3$ in the β-zeolite is more than or equal to 20 and less than 40, the particle diameter determined by SEM of the β-zeolite is 0.35 μm or more, the full width at half maximum (FWHM) of an X-ray diffraction peak for (302) of the β-zeolite is less than 0.30°, and an amount of adsorbed $NH_3$ is 1 mmol/g or more;
(13) an SCR catalyst according to (12), wherein the molar ratio of $SiO_2/Al_2O_3$ of the β-zeolite is more than or equal to 22 and less than 30 and the amount of adsorbed $NH_3$ of the β-zeolite is 1.2 mmol/g or more;
(14) an SCR catalyst according to (12), wherein a supported metal of the β-zeolite is at least one of a metal selected from groups of elements consisting of group VIII and group IB of a periodic table;
(15) an SCR catalyst according to (12), wherein the supported metal of the β-zeolite includes one or more of iron or copper;
(16) an SCR catalyst according to (12), wherein an NOx reduction rate following hydrothermal aging of 30% or more at 200° C.; and,
(17) an SCR catalyst according to (12), wherein the NOx reduction rate following hydrothermal aging of 75% or more at 250° C.

The β-zeolite for an SCR catalyst of the present invention provides superior SCR catalyst performance following hydrothermal aging, and particularly superior catalytic activity for NOx reduction at low temperatures, while also providing an SCR catalyst that is free of the problem of discharge of irritating and toxic ammonia in exhaust gas in the case of using ammonia as a reducing agent.

DETAILED DESCRIPTION OF THE INVENTION

The β-zeolite for an SCR catalyst of the present invention includes a β-zeolite for an SCR catalyst in which the molar ratio of $SiO_2/Al_2O_3$ is from 20 to less than 40, the particle diameter determined by SEM is 0.35 μm or more, the full width at half maximum (FWHM) of the X-ray diffraction peak for (302) is less than 0.30°, and the amount of adsorbed $NH_3$ prior to hydrothermal aging is 1 mmol/g or more.

In the β-zeolite for an SCR catalyst of the present invention, the molar ratio of $SiO_2/Al_2O_3$ is preferably from 20 to less than 40, particularly preferably from 22 to less than 30 and more preferably from 23 to less than 29. If this molar ratio is less than 20, heat resistance is not adequate, while in the case this ratio exceeds 40 at which heat resistance is typically high, the reducing performance of NOx at low temperatures of the present invention is unable to be demonstrated.

The particle diameter of the β-zeolite for an SCR catalyst of the present invention in terms of particle diameter determined by SEM is preferably 0.35 μm or more and particularly preferably 0.4 μm or more. Although there are no particular limitations on the upper limit thereof, the upper limit of particle diameter determined by SEM is preferably 2 μm or less from the viewpoints of dynamic catalysis performance and ease of production of the SCR catalyst.

The full width at half maximum (FWHM) of the X-ray diffraction peak for (302) of the β-zeolite for an SCR catalyst of the present invention in the fresh state is preferably less than 0.30° and particularly preferably 0.25° or less. Moreover, the full width at half maximum (FWHM) of the X-ray diffraction peak for (302) following hydrothermal aging is preferably less than 0.35° and particularly preferably less than 0.30°. If the aforementioned values for full width at half maximum (FWHM) under either condition are exceeded, the catalytic performance of the SCR catalyst, and particularly that at low temperatures, decreases.

The lower limit of the full width at half maximum (FWHM) of X-ray diffraction peak for (302) under each condition is down to about 0.15° at the molar ratio of $SiO_2/Al_2O_3$ of the present invention.

X-ray diffraction pattern in the present invention can be measured by powder X-ray diffraction using an ordinarily used Cu—Kα ray source, and is that having a main peak appearing in the vicinity of 2θ=22.4°. The particle diameter determined by SEM in the present invention refers to the result of randomly measuring 30 particles with a scanning electron microscope (SEM) followed by determining the mean particle diameter thereof.

The β-zeolite for an SCR catalyst of the present invention has an amount of adsorbed $NH_3$ of preferably 1 mmol/g or more and particularly preferably 1.2 mmol/g or more in the fresh state (prior to hydrothermal aging). If the amount of adsorbed $NH_3$ in the fresh state is less than 1 mmol/g, even though heat resistance increases, the catalytic activity for NOx reduction of the present invention is not demonstrated. Although there are no particular limitations on the upper limit of $NH_3$ adsorption in the fresh state (prior to hydrothermal aging), that which exhibits an amount of adsorbed $NH_3$ in excess of 1.5 mmol/g at the molar ratio of $SiO_2/Al_2O_3$ of the present invention lacks thermal stability and makes it difficult to demonstrate the SCR performance of the present invention.

The β-zeolite for an SCR catalyst of the present invention is not only required to have high $NH_3$ adsorption in the fresh state, but also to preferably have an amount of adsorbed $NH_3$ following hydrothermal aging of 0.4 mmol/g or more and particularly preferably 0.5 mmol/g or more. If the amount of adsorbed $NH_3$ after hydrothermal aging is less than 0.4 mmol/g, it becomes difficult to adequately demonstrate the performance of the SCR catalyst at low temperatures following hydrothermal aging.

Although there are no particular limitations on the upper limit of the amount of $NH_3$ adsorbed following hydrothermal aging, the upper limit is about 0.7 mmol/g at the molar ratio of $SiO_2/Al_2O_3$ of the present invention.

The SCR catalysts demonstrate NOx decomposition performance as a result of active metal, such as iron or copper, support of β-zeolite. Even if these metals are adequately supported, the performance of the SCR of the present invention is not demonstrated unless the amount of adsorbed $NH_3$ of the present invention is satisfied.

Hydrothermal aging, as referred to in the present invention, indicates a heat treatment in the presence of flowing air containing 10% by volume of steam water, and more specifically, indicates a treatment under the conditions described below. Although SCR catalysts are typically evaluated based on their performance following hydrothermal aging, the conditions of this hydrothermal aging are not standardized. The hydrothermal aging conditions in the present invention, namely a temperature of 700° C. and a moisture concentration in the air of 10% by volume, are within the range of typical conditions of hydrothermal aging conditions of SCR catalysts, and are not particularly extraordinary. Furthermore, thermal damage to zeolite, including β-zeolite, occurring at temperatures of 600° C. and above increases exponentially, and hydrothermal aging for 20 hours at 700° C. is equivalent to treatment for 100 to 200 hours or more at 650° C. or equivalent to treatment for a few hours at 800° C.

The hydrothermal aging conditions in the present invention are as indicated below.
 Temperature: 700° C.
 Duration: 20 hours
 Moisture concentration in gas: 10% by volume
 Gas flow rate/zeolite volume ratio: 100 times/min The amount of $NH_3$ adsorbed by β-zeolite is determined by quantitatively analyzing ammonia released from β-zeolite that has adsorbed ammonia, and can be measured with a commercially available automated apparatus for temperature programmed desorption.

The amount of adsorbed $NH_3$ in the present invention can be measured using the method described below.

The amount of adsorbed $NH_3$ is determined by removing adsorbed components from β-zeolite (using about 0.1 g regulated to a particle diameter of 500 μm to 840 μm) in an inert gas (helium), saturating a mixed gas consisting of 90% inert gas (helium) and 10% ammonia adsorbed at 25° C., and then heating the mixed gas to 700° C. followed by quantifying the amount of desorbed ammonia during the course of heating (but excluding that desorbed within a temperature range of 25 to 100° C.) with a mass spectrometer to determine the amount of adsorbed $NH_3$.

Next, the SCR catalyst of the present invention is that in which the NOx reduction rate at 200° C. following hydrothermal aging is preferably 30% or more and particularly preferably 35% or more. If the NOx reduction rate at 200° C. is less than 30%, catalyst activity decreases and becomes inadequate for practical use. There are no particular limitations on the upper limit thereof, and the upper limit is considered to vary depending on the supported metal species, and is about 50% following hydrothermal aging.

The SCR catalyst of the present invention more preferably has an NOx reduction rate at 250° C. of 75% or more. The NOx reduction rate of an SCR catalyst increases at higher temperatures and the performance following hydrothermal aging tends to decrease at lower temperatures. The SCR catalyst of the present invention has an NOx decomposition rate at 250° C. following hydrothermal aging of 75% or more, and durability is particularly superior. There are no particular limitations on the upper limit of the NOx reduction rate, and is preferably about 90% following hydrothermal aging.

The NOx reduction rate of the SCR catalyst in the present invention can be defined according to reduction of nitrogen oxide when the gases described below contact each other under the following conditions at a prescribed temperature. SCR catalysts are typically evaluated using a gas containing the NO gas to be reduced and decomposed and a reducing agent in the form of ammonia at a ratio of 1:1. The NOx reduction conditions used in the present invention are normally within the range of typical conditions for evaluating NOx reduction performance of SCR catalysts, and are not particularly extraordinary.

The conditions for evaluating NOx reduction of SCR catalyst in the present invention are as indicated below.
 Treatment gas composition:
 NO: 200 ppm
 $NH_3$: 200 ppm
 $O_2$: 10 vol %
 $H_2O$: 3 vol %
 Remainder: Balance
 Treatment gas flow rate: 1.5 liters/min
 Treatment gas/catalyst volume ratio: 1000/min The SCR catalyst of the present invention preferably has at least one of a metal selected from groups of elements consisting of group VIII and IB of the periodic table supported on the β-zeolite, particularly preferably has at least one of a metal selected from the group consisting of iron, cobalt, palladium, iridium, platinum, copper, silver and gold, more preferably has at least one of a metal selected from the group consisting of iron, palladium, platinum, copper and silver, and furthermore preferably has iron or copper, supported on the β-zeolite.

Moreover, a co-catalyst component such as a rare earth metal, titanium or zirconia can be additively added. There are no particular limitations on the supporting method in the case of supporting an active metal species. Examples of supporting methods that can be used include ion exchange method, impregnation method, evaporation to dryness method, precipitation method and physical mixing method. Soluble or insoluble compound can be used for the raw material used for metal loading, examples of which include nitrates, sulfates, acetates, chlorides, complex salts, oxides and complex oxides.

Although there are no particular limitations on the supported amount of metal, it is preferably within the range of 0.1 to 10% by weight and particularly preferably within the range of 2 to 7% by weight.

The SCR catalyst of the present invention can also be used by mixing and molding with silica, alumina and a binder such as a clay mineral. Examples of clay minerals used for molding include kaolin, attapulgite, montmorillonite, bentonite, allophane and sepiolite.

The SCR catalyst of the present invention can be purified of exhaust gas by contacting with the exhaust gas containing nitrogen oxide.

Examples of nitrogen oxides purified with the present invention include nitrogen monoxide, nitrogen dioxide, dinitrogen trioxide, dinitrogen tetroxide, dinitrogen monoxide and mixtures thereof, while preferable examples consist of nitrogen monoxide, nitrogen dioxide and dinitrogen monoxide. Here, there are no limitations on the concentration of nitrogen oxide in exhaust gas capable of being treated by the present invention.

In addition, components other than nitrogen oxides may also be contained in the exhaust gas, and examples of components that may be contained include hydrocarbons, carbon monoxide, carbon dioxide, hydrogen, nitrogen, oxygen, sulfur oxide and water. More specifically, in the method of the present invention, nitrogen oxides can be purified from a wide range of exhaust gas such as that from diesel vehicles, gasoline vehicles, boilers and gas turbines.

The SCR catalyst of the present invention purifies nitrogen oxides in the presence of a reducing agent.

Hydrocarbons, carbon monoxide or hydrogen and the like contained in the exhaust gas can be used as reducing agents, and a suitable reducing agent is used by adding to the exhaust gas so that it is present with the exhaust gas. Although there are no particular limitations on the reducing agent added to the exhaust gas, examples include ammonia, urea, organic amines, hydrocarbons, alcohols, ketones, carbon monoxide and hydrogen. In particular ammonia, urea and organic amines are used to further enhance the purification efficiency of nitrogen oxides.

There are no particular limitations on the addition method of these reducing agents, and examples of methods that can be used include methods in which a reducing component is added directly in gaseous form, methods in which a liquid such as an aqueous solution is vaporized by spraying, and a spray pyrolysis method. The amounts of these reducing agents added can be set arbitrarily so that nitrogen oxides are adequately purified.

In the nitrogen oxide purification method of the present invention, although there are no particular limitations on the space velocity during contact between the SCR catalyst and exhaust gas, the space velocity is preferably 500 to 500,000 $hr^{-1}$ and more preferably 2000 to 300,000 $hr^{-1}$ by volume.

In the SCR catalyst of the present invention, not only is NOx purification activity high, but there is little discharge of irritating and toxic components in the exhaust gas when used as an SCR catalyst.

Since the activity of previously known catalysts was low in the case of using ammonia as a reducing agent, to prevent a problem of a large amount of irritating and toxic ammonia from being discharged, a decomposition process of the ammonia was needed which used a different catalyst system on the downstream side of the SCR catalyst.

In the SCR catalyst of the present invention, since catalyst activity is high even at low temperatures, ammonia used as a reducing agent is efficiently consumed, the discharged amount of ammonia is low and either the problem of odor is small or the load on a catalyst system for decomposing unreacted ammonia is remarkably low.

There are no particular limitations on the method used to produce the β-zeolite for an SCR catalyst of the present invention, and the β-zeolite is produced by selecting conditions that satisfy the molar ratio of $SiO_2/Al_2O_3$, particle diameter determined by SEM and crystallinity of the present invention. The production of β-zeolite that satisfies the characteristics of the present invention makes it possible to satisfy the characteristics of the SCR catalyst of the present invention, namely a superior catalytic activity of NOx reduction at low temperatures following hydrothermal aging, not previously found in the prior art.

β-zeolite can ordinarily be produced by hydrothermal synthesis in the presence of a silica source, aluminum source, alkali source, organic structure-directing agent (SDA), water, and as optionally, a fluorine source. Examples of conditions used for the production of the β-zeolite for an SCR catalyst of the present invention are indicated with the following ranges:

molar ratio of $SiO_2/Al_2O_3$:20 to 40,
molar ratio of base/$SiO_2$:0 to 0.1,
molar ratio of $H_2O/SiO_2$:7 to 15,
molar ratio of SDA/$SiO_2$:0.10 to 0.30,
and in the case of using an F raw material:
molar ratio of F/$SiO_2$:0.1 to 5.

Control of the molar ratio of $SiO_2/Al_2O_3$ and particle diameter determined by SEM of the present invention by the production conditions described above may be carried out according to, for example, the method described in Patent Document 8 disclosed by the applicant of the present invention.

In the present invention, a typical organic structure-directing agent or fluorine compound may also be used if the aforementioned conditions are satisfied.

Examples of SDA raw materials include tetraethyl ammonium hydroxide, tetraethyl ammonium bromide or tetraethyl ammonium fluoride having a tetraethyl ammonium cation as well as octylmethylene bis-quinuclidinium, α,α'-diquinuclidinium-p-xylene, α,α'-diquinuclidinium-m-xylene, α,α'-diquinuclidinium-o-xylene, 1,4-diazabicyclo[2,2,2]octane, 1,3,3,N,N-pentamethyl-6-azoniumbicyclo[3,2,1]octane and N,N-diethyl-1,3,3-trimethyl-6-azoniumbicyclo[3,2,1]octane cation.

Examples of fluorine compound raw materials that can be used include hydrofluoric acid, ammonium fluoride, sodium fluoride, silicon fluoride, ammonium silicofluoride and sodium silicofluoride.

EXAMPLES

Although the following provides an explanation of the present invention using examples thereof, the present invention is not limited by these examples.

Example 1

An aqueous sodium silicate solution and an aqueous aluminum sulfate solution were reacted while stirring so that the composition of a slurry product was $SiO_2$:0.05 $Al_2O_3$ to obtain a slurry product followed by dehydrating and washing to obtain a granular amorphous aluminosilicate.

Next, TEAF and water were added and mixed so that the composition of the reaction mixture was $SiO_2$:0.05 $Al_2O_3$: 0.67 TEAF:11.0$H_2O$ followed by the addition of 0.36 parts by weight of a seed crystal (Tosoh Corp., HSZ940NHA) to 100 parts by weight of the composition and crystallizing in an autoclave by hydrothermal synthesis for 72 hours at 155° C. Following crystallization, the slurry was washed and dried at 110° C. (TEAF: tetraethyl ammonium fluoride hydrate 50%). This dry powder was fired at 600° C. to obtain β-zeolite having a molar ratio of $SiO_2/Al_2O_3$ of 25.

The molar ratio of $SiO_2/Al_2O_3$, particle diameter determined by SEM, half width of the main diffraction peak in X-ray diffraction (2θ=22.4°) and amount of adsorbed ammonia following hydrothermal aging of the resulting β-zeolite are shown in Table 1.

Example 2

β-zeolite having a molar ratio of $SiO_2/Al_2O_3$ of 29 was synthesized by carrying out treatment in the same manner as Example 1 with the exception of making the composition of the raw material slurry using aqueous sodium silicate solution and aqueous aluminum sulfate solution $SiO_2$:0.034 $Al_2O_3$, making the composition of the reaction mixture $SiO_2$:0.034 $Al_2O_3$:0.16 TEAOH:9.9$H_2O$, making the conditions of hydrothermal synthesis at 150° C. for 66 hours and a firing temperature of 600° C. (TEAOH: tetraethyl ammonium hydroxide, 35% aqueous solution).

The molar ratio of $SiO_2/Al_2O_3$, particle diameter determined by SEM, half width of the main diffraction peak in X-ray diffraction (2θ=22.4°) and amount of adsorbed ammonia following hydrothermal aging of the resulting β-zeolite are shown in Table 1.

Example 3

β-zeolite having a molar ratio of $SiO_2/Al_2O_3$ of 24 was synthesized by carrying out treatment in the same manner as Example 1 with the exception of making the composition of the raw material slurry using aqueous sodium silicate solution and aqueous aluminum sulfate solution $SiO_2$:0.07 $Al(OH)_3$, making the composition of the reaction mixture $SiO_2$:0.07 $Al(OH)_3$: 0.10 KOH:0.30 TEAOH:9.9$H_2O$, using HSZ930NHA (Tosoh Corp.) for the seed crystal, making the conditions of hydrothermal synthesis at 150° C. for 88 hours and a firing temperature of 600° C.

The molar ratio of $SiO_2/Al_2O_3$, particle diameter determined by SEM, half width of the main diffraction peak in X-ray diffraction (2θ=22.4°) and amount of adsorbed ammonia following hydrothermal aging of the resulting β-zeolite are shown in Table 1.

Example 4

β-zeolite having a molar ratio of $SiO_2/Al_2O_3$ of 29 was synthesized by carrying out treatment in the same manner as Example 1 with the exception of making the composition of the raw material slurry using aqueous sodium silicate solution and aqueous aluminum sulfate solution $SiO_2$:0.034 $Al_2O_3$, making the composition of the reaction mixture $SiO_2$:0.034 $Al_2O_3$:0.05 KOH:0.14 TEAOH:9.9$H_2O$, using HSZ930NHA (Tosoh Corp.) for the seed crystal, making the conditions of hydrothermal synthesis at 150° C. for 88 hours and a firing temperature of 600° C.

The molar ratio of $SiO_2/Al_2O_3$, particle diameter determined by SEM, half width of the main diffraction peak in X-ray diffraction (2θ=22.4°) and amount of adsorbed ammonia following hydrothermal aging of the resulting β-zeolite are shown in Table 1.

Example 5

β-zeolite having a molar ratio of $SiO_2/Al_2O_3$ of 29 was synthesized by carrying out treatment in the same manner as Example 1 with the exception of making the composition of the raw material slurry using aqueous sodium silicate solution and aqueous aluminum sulfate solution $SiO_2$:0.034 $Al_2O_3$, making the composition of the reaction mixture $SiO_2$:0.034 $Al_2O_3$:0.07 TEABr:0.13 TEAOH:9.9$H_2O$, using HSZ930NHA (Tosoh Corp.) for the seed crystal, making the conditions of hydrothermal synthesis at 150° C. for 144 hours and a firing temperature of 600° C. (TEABr: tetraethyl pentammonium bromide, 50% aqueous solution).

The molar ratio of $SiO_2/Al_2O_3$, particle diameter determined by SEM, half width of the main diffraction peak in X-ray diffraction (2θ=22.4°) and amount of adsorbed ammonia following hydrothermal aging of the resulting β-zeolite are shown in Table 1.

Example 6

β-zeolite having a molar ratio of $SiO_2/Al_2O_3$ of 29 was synthesized by carrying out treatment in the same manner as Example 1 with the exception of using amorphous silica powder (trade name: NipSeal VN-3, Tosoh Silica Corp.) and aluminum hydroxide, making the composition of the reaction mixture $SiO_2$:0.034 $Al_2O_3$:0.16 TEAOH:9.9$H_2O$, using HSZ930NHA (Tosoh Corp.) for the seed crystal, making the conditions of hydrothermal synthesis at 150° C. for 120 hours and a firing temperature of 600° C.

The molar ratio of $SiO_2/Al_2O_3$, particle diameter determined by SEM, half width of the main diffraction peak in X-ray diffraction (2θ=22.4°) and amount of adsorbed ammonia following hydrothermal aging of the resulting β-zeolite are shown in Table 1.

Example 7

Tetraethyl orthosilicate, aluminum isopropoxide and TEAOH were mixed and then stirred at room temperature to evaporate the ethanol and water. β-zeolite having a molar ratio of $SiO_2/Al_2O_3$ of 29 was synthesized by carrying out treatment in the same manner as Example 1 with the exception of making the composition of the reaction mixture $SiO_2$: 0.034 $Al_2O_3$:0.16 TEAOH:9.9$H_2O$, using HSZ930NHA (Tosoh Corp.) for the seed crystal, making the conditions of hydrothermal synthesis at 150° C. for 72 hours and a firing temperature of 600° C.

The molar ratio of $SiO_2/Al_2O_3$, particle diameter determined by SEM, half width of the main diffraction peak in X-ray diffraction (2θ=22.4°) and amount of adsorbed ammonia following hydrothermal aging of the resulting β-zeolite are shown in Table 1.

Comparative Example 1

β-zeolite having a molar ratio of $SiO_2/Al_2O_3$ of 22 was synthesized by carrying out treatment in the same manner as Example 1 with the exception of making the composition of the raw material slurry using aqueous sodium silicate solution and aqueous aluminum sulfate solution $SiO_2$: 0.08 $Al(OH)_3$, making the composition of the reaction mixture $SiO_2$:0.08 $Al(OH)_3$:0.05 KOH:0.14 TEAOH:9.9$H_2O$, using HSZ930NHA (Tosoh Corp.) for the seed crystal, and making the conditions of hydrothermal synthesis at 150° C. for 88 hours.

The molar ratio of $SiO_2/Al_2O_3$, particle diameter determined by SEM, half width of the main diffraction peak in X-ray diffraction (2θ=22.4°) and amount of adsorbed ammonia following hydrothermal aging of the resulting β-zeolite are shown in Table 1.

TABLE 1

|  | Hydrothermal aging | $SiO_2/Al_2O_3$ ratio | particle diameter determined by SEM (μm) | XRD FWHM | $NH_3$-TPD |
|---|---|---|---|---|---|
| Example 1 | Before | 25 | 0.78 | 0.24 | 1.30 |
|  | After |  |  | 0.22 | 0.41 |
| Example 2 | Before | 29 | 0.43 | 0.24 | 1.37 |
|  | After |  |  | 0.26 | 0.51 |
| Example 3 | Before | 24 | 0.52 | 0.26 | 1.29 |
|  | After |  |  | 0.32 | 0.42 |
| Example 4 | Before | 29 | 0.43 | 0.24 | 1.20 |
|  | After |  |  | 0.29 | 0.41 |
| Example 5 | Before | 29 | 0.40 | 0.25 | 1.30 |
|  | After |  |  | 0.26 | 0.40 |
| Example 6 | Before | 29 | 0.45 | 0.24 | 1.31 |
|  | After |  |  | 0.27 | 0.48 |
| Example 7 | Before | 29 | 0.44 | 0.24 | 1.28 |
|  | After |  |  | 0.25 | 0.43 |

TABLE 1-continued

| | Hydro-thermal aging | SiO₂/Al₂O₃ ratio | particle diameter determined by SEM (μm) | XRD FWHM | NH₃-TPD |
|---|---|---|---|---|---|
| Comparative Example 1 | Before | 22 | 0.34 | 0.24 | 1.33 |
| | After | | | 0.30 | 0.50 |
| Conventional Product 1 | Before | 41 | 0.62 | 0.26 | 0.52 |
| | After | | | 0.24 | 0.30 |
| Conventional Product 2 | Before | 27 | 0.20 | 0.46 | 1.08 |
| | After | | | 0.36 | 0.38 |
| Conventional Article | Before | 491 | 0.62 | 0.18 | 0.12 |
| | After | | | 0.18 | 0.10 |

Evaluation of SCR Catalyst Performance

SCR catalysts were obtained by supporting each of the β-zeolites of Examples 1 to 7, Comparative Example 1 and commercially available β-zeolites with 3% by weight of Fe metal using an aqueous solution of Fe(NO₃)₃.nonahydrate. The commercially available β-zeolites consisted of β-zeolite having a molar ratio of SiO₂/Al₂O₃ of 41 (trade name: HSZ-940NHA, Tosoh Corp., "Conventional Product 1" in Table 2), β-zeolite having a molar ratio of SiO₂/Al₂O₃ of 27 (trade name: HSZ-930NHA, Tosoh Corp., "Conventional Product 2" in Table 2) fired in air at 600° C. to convert to H-zeolite, and that having a molar ratio of SiO₂/Al₂O₃ of 491 obtained from H-zeolite having a molar ratio of SiO₂/Al₂O₃ of 40 by an ordinary method (treatment with inorganic acid) ("Conventional Article" in Table 2).

After firing each of the SCR catalysts in air at 500° C., the catalysts were evaluated under the nitrogen reducing conditions of the present invention. The results are shown in Table 2.

The commercially available β-zeolites had an amount of adsorbed ammonia outside the range of the present invention and demonstrated low SCR catalyst characteristics at low temperatures. Although the β-zeolite of Comparative Example 1 satisfied the requirement for the amount of adsorbed ammonia, it did not satisfy other conditions and demonstrated inadequate low-temperature characteristics when used in an SCR catalyst.

SCR catalysts using the β-zeolite of the present invention demonstrated high NOx reduction rates at low temperatures even after hydrothermal aging, and demonstrated activity was 20% of more and a maximum of roughly three times greater than the conventional article.

TABLE 2

| | Hydro-thermal aging | SCR Catalyst Performance 3% Fe supporting, NOx reduction rate (%) | | | NH₃ concentration in exhaust gas at 200° C. (ppm) |
|---|---|---|---|---|---|
| | | 200° | 250° C. | 400° C. | |
| Example 1 | Before | 62 | 78 | 71 | 76 |
| | After | 33 | 75 | 84 | 134 |
| Example 2 | Before | 55 | 78 | 83 | 90 |
| | After | 30 | 83 | 91 | 140 |
| Example 3 | Before | 66 | 88 | 84 | 68 |
| | After | 38 | 76 | 86 | 124 |
| Example 4 | Before | 57 | 81 | 84 | 86 |
| | After | 30 | 72 | 74 | 140 |
| Example 5 | Before | 56 | 79 | 81 | 88 |
| | After | 30 | 80 | 82 | 140 |
| Example 6 | Before | 60 | 83 | 85 | 80 |
| | After | 31 | 80 | 86 | 138 |
| Example 7 | Before | 58 | 78 | 81 | 84 |
| | After | 30 | 76 | 82 | 140 |
| Comparative Example 1 | Before | 65 | 84 | 88 | 70 |
| | After | 24 | 71 | 91 | 152 |
| Conventional Product 1 | Before | 28 | 71 | 94 | 144 |
| | After | 13 | 50 | 87 | 174 |
| Conventional Product 2 | Before | 61 | 83 | 87 | 78 |
| | After | 25 | 75 | 94 | 150 |
| Conventional Article | Before | 33 | 73 | 86 | 134 |
| | After | 19 | 60 | 81 | 162 |

The β-zeolite for an SCR catalyst of the present invention has superior SCR catalyst performance following hydrothermal aging, and particularly catalytic activity for NOx reduction at low temperatures, and in the case of using ammonia as a reducing agent, is able to provide an SCR catalyst free of problems associated with the discharge of irritating and toxic ammonia in exhaust gas.

What is claimed is:

1. A method for reducing nitrogen oxides comprising:
reducing a nitrogen oxide with an SCR catalyst, said SCR catalyst comprises β-zeolite; wherein a molar ratio of SiO₂/Al₂O₃ in said β-zeolite is more than or equal to 20 and less than 40; a mean particle diameter determined by SEM of said β-zeolite is 0.35 μm or more; a full width at half maximum (FWHM) of an X-ray diffraction peak for (302) of said β-zeolite is less than 0.30° ; and an amount of adsorbed NH₃ of said β-zeolite is 1.2 mmol/g or more prior to hydrothermal aging.

2. A method for reducing nitrogen oxides according to claim 1, wherein said molar ratio of SiO₂/Al₂O₃ is more than or equal to 22 and less than 30.

3. A method for reducing nitrogen oxides according to claim 1, wherein a supported metal of said β-zeolite is at least one of a metal selected from groups of elements consisting of group VIII and group IB of a periodic table.

4. A method for reducing nitrogen oxides according to claim 1, wherein said supported metal of said β-zeolite comprises one or more of iron or copper.

5. A method for reducing nitrogen oxides according to claim 1, wherein an NOx reduction rate of said β-zeolite following hydrothermal aging is 30% or more at 200° C.

6. A method for reducing nitrogen oxides according to claim 1, wherein said NOx reduction rate following hydrothermal aging is 75% or more at 250° C.

7. A β-zeolite having a molar ratio of SiO₂/Al₂O₃ of more than or equal to 20 and less than 40, a mean particle diameter determined by SEM of 0.35 μm or more, a full width at half maximum (FWHM) of an X-ray diffraction peak for (302) plane of less than 0.30° , and an amount of adsorbed NH₃ of 1.2 mmol/g or more prior to hydrothermal aging.

8. A β-zeolite according to claim 7, wherein said molar ratio of SiO₂/Al₂O₃ is more than or equal to 22 and less than 30.

9. A β-zeolite according to claim 7, wherein said particle diameter determined by SEM is 0.5 μm or more.

10. A β-zeolite according to claim 7, wherein said molar ratio of SiO₂/Al₂O₃ is more than or equal to 23 and less than 29.

11. A β-zeolite according to claim 7, wherein said full width at half maximum (FWHM) of the X-ray diffraction peak for (302) following hydrothermal aging is less than 0.35°, and said amount of adsorbed $NH_3$ is 0.4 mmol/g or more following hydrothermal aging.

12. An SCR catalyst comprising β-zeolite, wherein a molar ratio of $SiO_2/Al_2O_3$ in said β-zeolite is more than or equal to 20 and less than 40, a mean particle diameter determined by SEM of said β-zeolite is 0.35 μm or more, a full width at half maximum (FWHM) of an X-ray diffraction peak for (302) of said β-zeolite is less than 0.30°, and an amount of adsorbed $NH_3$ of said β-zeolite is 1.2 mmol/g or more prior to hydrothermal aging.

13. An SCR catalyst according to claim 12, wherein said molar ratio of $SiO_2/Al_2O_3$ is more than or equal to 22 and less than 30.

14. An SCR catalyst according to claim 12, wherein a supported metal of said β-zeolite is at least one of a metal selected from groups of elements consisting of group VIII and group IB of a periodic table.

15. An SCR catalyst according to claim 12, wherein said supported metal of said β-zeolite comprises one or more of iron or copper.

16. An SCR catalyst according to claim 12, wherein an NOx reduction rate of said β-zeolite following hydrothermal aging is 30% or more at 200° C.

17. An SCR catalyst according to claim 12, wherein said NOx reduction rate following hydrothermal aging is 75% or more at 250° C.

* * * * *